(12) United States Patent
Denisyuk et al.

(10) Patent No.: US 7,172,811 B2
(45) Date of Patent: Feb. 6, 2007

(54) METHODS OF PREPARING POLYMER NANOCOMPOSITE HAVING SURFACE MODIFIED NANOPARTICLES

(75) Inventors: Igor Y. Denisyuk, St. Petersburg (RU); Todd R. Williams, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 84 days.

(21) Appl. No.: 11/089,347

(22) Filed: Mar. 24, 2005

(65) Prior Publication Data

US 2006/0217478 A1  Sep. 28, 2006

(51) Int. Cl.
*B05D 1/36* (2006.01)

(52) U.S. Cl. ............... 428/402; 428/403; 428/404; 428/407; 427/214; 427/215; 427/220

(58) Field of Classification Search ......... 428/402, 428/403, 404, 407; 427/214
See application file for complete search history.

(56) References Cited

U.S. PATENT DOCUMENTS

| | | | |
|---|---|---|---|
| 5,525,377 | A | 6/1996 | Gallagher et al. |
| 5,777,433 | A | 7/1998 | Lester et al. |
| 6,548,168 | B1 | 4/2003 | Mulvaney et al. |
| 6,649,138 | B2 * | 11/2003 | Adams et al. ............ 423/403 |
| 6,783,963 | B2 | 8/2004 | Mukherjee et al. |
| 6,887,517 | B1 * | 5/2005 | Cook et al. ............. 427/214 |
| 2002/0066401 | A1 | 6/2002 | Peng et al. |
| 2002/0106476 | A1 | 8/2002 | Hirai et al. |
| 2003/0031438 | A1 | 2/2003 | Kambe et al. |
| 2003/0172888 | A1 | 9/2003 | Nho et al. |
| 2003/0175004 | A1 | 9/2003 | Garito et al. |
| 2003/0191221 | A1 | 10/2003 | Meyers et al. |
| 2004/0007169 | A1 | 1/2004 | Ohtsu et al. |
| 2004/0095658 | A1 | 5/2004 | Buretea et al. |
| 2004/0101967 | A1 | 5/2004 | Peng et al. |
| 2004/0233526 | A1 | 11/2004 | Kaminsky et al. |
| 2005/0006800 | A1 | 1/2005 | Mountziaris et al. |
| 2005/0040376 | A1 | 2/2005 | James et al. |
| 2006/0159923 | A1 | 7/2006 | Becker-Willinger et al. |
| 2006/0160940 | A1 * | 7/2006 | Muhlebach et al. ........ 524/445 |

FOREIGN PATENT DOCUMENTS

EP  1 431 352  6/2004

OTHER PUBLICATIONS

Lu et al., High Refractive Index Thin Films of ZnS/polythiourethane, J. Mater. Chem., 2003, 13, 526-530.
Lu et al., Preparation and Characterization of ZnS-polymer Nanocomposite Films With High Refractive Index, J. Mater. Chem., 2003, 13, 2189-2195.
Caseri, Nanocomposites of polymers and metals or semiconductors: Historical background and optical properties, Macromol. Rapid Commun. 21, No. 11, 705-722 (2000).
Al-Tarazi et al., Precipitation of CuS and ZnS in a Bubble Column Reactor, AIChE Journal, 2005, vol. 51, No. 1.
Toyoda, et al., "Irradiation time dependence of Mn-doped ZnS nanocrystals with carboxylic acid on radiative and non-radiative transitions"., *Preparation and Characterization*, Elsevier Sequoia, NL, vol. 438-439 (Aug. 22, 2003) pp. 132-136.
Zhou, et al., "Fabrication of Three-Dimensional Surface Structures with Highly Fluorescent Quantum Dots by Surface-Templated Layer-by-Layer Assembly", *Advanced Materials*, 2005, vol. 17, pp. 1243-1248.

* cited by examiner

*Primary Examiner*—Ling-Sui Choi
*Assistant Examiner*—Henry S. Hu
(74) *Attorney, Agent, or Firm*—Elizabeth A. Gallo

(57) ABSTRACT

The present disclosure provides a method of preparing a nanocomposite: (a) providing a first solution having a first organic solvent comprising a non-alkali metal salt, a carboxylic acid comprising at least one aryl group, and a polymer dissolved therein; (b) providing a sulfide material; (c) combining the first solution and the sulfide material; and (d) isolating the nanocomposite, wherein the nanocomposite comprises the polymer and a plurality of nanoparticles, wherein each nanoparticle comprises at least one metal sulfide nanocrystal having a surface modified with the carboxylic acid comprising at least one aryl group. The present disclosure also provides the nanocomposites and articles prepared therefrom.

18 Claims, No Drawings

METHODS OF PREPARING POLYMER NANOCOMPOSITE HAVING SURFACE MODIFIED NANOPARTICLES

CROSS-REFERENCE TO RELATED APPLICATIONS

This application is related to commonly assigned, co-pending U.S. Patent Applications:

Ser. No. 11/089,323 by Denisiuk et al., entitled "Surface Modified Nanoparticle and Method of Preparing Same", and filed of even date herewith; and Ser. No. 11/089,319 by Denisiuk et al., entitled "Polymer Nanocomposite Having Surface Modified Nanoparticles and Methods of Preparing Same", and filed of even date herewith.

FIELD OF THE INVENTION

The present disclosure relates to methods of preparing a nanocomposite, and particularly to methods of preparing a polymer nanocomposite comprising a plurality of surface modified nanoparticles.

BACKROUND

Nanocomposites are mixtures of at least two different components wherein at least one of the components has one or more dimensions in the nanometer region. Nanocomposites have found use in many applications because, for example, they exhibit properties attributable to each of its components. One type of nanocomposite comprises nanoparticles distributed in an organic matrix such as a polymer. This type of nanocomposite is useful in optical applications, wherein the nanoparticles are used to increase the refractive index of the polymer. The nanoparticles must be uniformly distributed with minimal coagulation within the polymer, such that the nanocomposite exhibits minimal haze due to light scattering.

There is a need for nanocomposites that can be readily prepared and that are suitable for use in optical applications.

SUMMARY

The present disclosure provides a method of preparing a nanocomposite, the method comprising (a) providing a first solution having a first organic solvent comprising a non-alkali metal salt, a carboxylic acid comprising at least one aryl group, and a polymer dissolved therein; (b) providing a sulfide material; (c) combining the first solution and the sulfide material; and (d) isolating the nanocomposite, wherein the nanocomposite comprises the polymer and a plurality of nanoparticles, wherein each nanoparticle comprises at least one metal sulfide nanocrystal having a surface modified with the carboxylic acid comprising at least one aryl group.

The present disclosure also provides the nanocomposite, and articles made therefrom, any of which may be useful in a variety of applications such as optical applications.

DETAILED DESCRIPTION

The present disclosure relates to a method of preparing a nanocomposite, the method comprising:

(a) providing a first solution having a first organic solvent comprising a non-alkali metal salt, a carboxylic acid comprising at least one aryl group, and a polymer dissolved therein;

(b) providing a sulfide material;

(c) combining the first solution and the sulfide material; and (d) isolating the nanocomposite, wherein the nanocomposite comprises the polymer and a plurality of nanoparticles, wherein each nanoparticle comprises at least one metal sulfide nanocrystal having a surface modified with the carboxylic acid comprising at least one aryl group.

The first organic solvent may be any organic solvent capable of dissolving the non-alkali metal salt, the carboxylic acid comprising at least one aryl group, and the polymer, and it must also be compatible with the sulfide material. In one embodiment, the first organic solvent is a dipolar, aprotic organic solvent such as dimethylformamide, dimethylsulfoxide, pyridine, tetrahydrofuran, 1,4-dioxane, N-methylpyrrolidone, propylene carbonate, or mixtures thereof.

The non-alkali metal salt provides metal ions that combine stoichiometrically with the sulfide material to form metal sulfide nanocrystals. The particular choice of non-alkali metal salt may depend upon any number of factors such as the properties of the first solvent, the carboxylic acid comprising at least one aryl group, and/or the polymer. For example, in one embodiment, the non-alkali metal salt is a salt of a transition metal, a salt of a Group IIA metal, or mixtures thereof. When any one of these metal salts is employed, the nanocomposite disclosed herein may be readily isolated. Examples of transition metals and Group IIA metals are Ba, Ti, Mn, Zn, Cd, Zr, Hg, and Pb.

Another factor that influences the choice of the non-alkali metal salt is the desired properties of the metal sulfide nanocrystals, and therefore, the desired properties of the nanocomposite. For example, if the nanocomposite is to be used for optical applications, then the non-alkali metal salt may be a zinc salt because zinc sulfide nanocrystals are colorless and have a high refractive index. For semiconductor applications, the non-alkali metal salt may be a cadmium salt because cadmium sulfide nanocrystals can absorb and emit light in useful energy ranges.

The carboxylic acid comprising at least one aryl group modifies the surface of the at least one metal sulfide nanocrystal. The particular choice of carboxylic acid comprising at least one aryl group may depend upon the solvents and the non-alkali metal salt used in the method described above. The carboxylic acid comprising at least one aryl group must dissolve in the first organic solvent and must be capable of surface modifying the at least one metal sulfide nanocrystal that forms upon combination of the first solution with the sulfide material. The carboxylic acid comprising at least one aryl group may also aid compatibility of the nanoparticles with the polymer. In one embodiment, the carboxylic acid comprising at least one aryl group has a molecular weight of from 60 to 1000 in order to be soluble in the first organic solvent and give nanoparticles that are compatible with a wide variety of polymers.

In another embodiment, the carboxylic acid comprising at least one aryl group is represented by the formula:

$$Ar-L^1-CO_2H$$

wherein $L^1$ comprises an alkylene residue of from 1 to 10 C atoms, and wherein the alkylene residue is saturated, unsaturated, straight-chained, branched, or alicyclic; and Ar comprises a phenyl, phenoxy, naphthyl, naphthoxy, fluorenyl, phenylthio, or naphthylthio group.

The alkylene residue may be methylene, ethylene, propylene, butylene, or pentylene. If the alkylene residue has greater than 5 C atoms, solubility in the first organic solvent may be limited and/or surface modification may be less effective. The alkylene residue and/or the aryl group may be substituted with alkyl, aryl, alkoxy, halogen, or other groups. The carboxylic acid comprising at least one aryl group may be 3-phenylpropionic acid; 4-phenylbutyric acid; 5-phenylvaleric acid; 2-phenylbutyric acid; 3-phenylbutyric acid; 1-napthylacetic acid; 3,3,3-triphenylpropionic acid; triphenylacetic acid; 2-methoxyphenylacetic acid; 3-methoxyphenylacetic acid; 4-methoxyphenylacetic acid; 4-phenylcinnamic acid; or mixtures thereof.

In another embodiment, the carboxylic acid comprising at least one aryl group is represented by the formula:

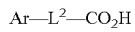

Ar—L$^2$—CO$_2$H wherein L$^2$ comprises a phenylene or napthylene residue; and

Ar comprises a phenyl, phenoxy, naphthyl, naphthoxy, fluorenyl, phenylthio, or naphthylthio group.

The phenylene or napthylene residue and/or the aryl group may be substituted with alkyl, aryl, alkoxy, halogen, or other groups. The carboxylic acid comprising at least one aryl group may be 2-phenoxybenzoic acid; 3-phenoxybenzoic acid; 4-phenoxybenzoic acid; 2-phenylbenzoic acid; 3-phenylbenzoic acid; 4-phenylbenzoic acid; or mixtures thereof.

In the first solution, useful weight ratios of the carboxylic acid comprising at least one aryl group to the non-alkali metal salt are from 1:2 to 1:200. In one embodiment, the mole ratio of the carboxylic acid comprising at least one aryl group to the non-alkali metal salt is less than 1:10. The particular weight ratio used will depend on a variety of factors such as the solubilities of the carboxylic acid comprising at least one aryl group and the non-alkali metal salt, the identity of the sulfide material, the reaction conditions, e.g. temperature, time, agitation, etc.

The polymer used in (a) may have any structural composition, for example, it may be an addition polymer formed by addition of unsaturated monomers via a free radical or cationic mechanism, or it may be a condensation polymer formed by the elimination of water between monomers. The polymer may also be random, block, graft, dendrimeric, etc. In one embodiment, the polymer comprises a thermoplastic polymer.

In one embodiment, the polymer may be a polyolefin, polystyrene, polyacrylate, polymethacrylate, polyacrylic acid, polymethacrylic acid, polyether, polybutadiene, polyisoprene, polyvinylchloride, polyvinylalcohol, polyvinyl acetate, polyester, polyurethane, polyurea, polycarbonate, polyamide, polyimide, polyepoxide, cellulose, or mixtures thereof. In another embodiment, the polymer may be a copolymer of a polyolefin, polystyrene, polyacrylate, polymethacrylate, polyacrylic acid, polymethacrylic acid, polyether, polybutadiene, polyisoprene, polyvinylchloride, polyvinylalcohol, polyvinyl acetate, polyester, polyurethane, polyurea, polycarbonate, polyamide, polyimide, polyepoxide or cellulose. For example, the copolymer may be a polyester-polyurethane, polymethacrylate-polystyrene, etc. In yet another embodiment, the polymer comprises aromatic rings, halogens, and sulfur atoms for high refractive index. An example of a useful polymer is Polycarbonate Z (lupilon® Z-200 from Mitsubishi Gas Chemical, CAS # 25134-45-6).

The amount of polymer used in (a) may depend on a variety of factors including the particular polymer and non-alkali metal salt, as well as the desired properties of the nanocomposite such as optical and physical properties including refractive index, stiffness, hardness, gas permeability, durability, electrical conductivity, etc. The desired properties of the nanocomposite may depend on the application in which it is used. In one embodiment, the plurality of nanoparticles may be used to increase the refractive index of the polymer, and the plurality of nanoparticles are present in an amount such that the refractive index of the nanocomposite is at least 0.01 greater than the refractive index of the polymer. In another embodiment, the plurality of nanoparticles are present in an amount such that the nanocomposite has a refractive index of at least 1.61, because most polymers have a refractive index no greater than 1.6. In another embodiment, the plurality of nanoparticles are present in an amount of 50 weight % or less, relative to the weight of the polymer. In yet another embodiment, the plurality of nanoparticles are present in an amount of 25 volume % or less, relative to the volume of the polymer. Addition of a polymeric plasticizer may allow a higher level of nanoparticles to be included while maintaining moldability.

The sulfide material used in (b) provides sulfide that stoichiometrically reacts with the non-alkali metal ions to form the at least one metal sulfide nanocrystal. In one embodiment, the sulfide material comprises hydrogen sulfide gas that may be bubbled through the first solution. In another embodiment, the sulfide material comprises a second solution of a second organic solvent containing hydrogen sulfide gas or sulfide ions dissolved therein, wherein the second organic solvent is miscible with the first organic solvent. Useful second organic solvents are methanol, ethanol, isopropanol, propanol, isobutanol, or mixtures thereof. The second solution of sulfide ions may be obtained by dissolution of a sulfide salt in the second organic solvent; useful sulfide salts are an alkali metal sulfide, ammonium sulfide, or a substituted ammonium sulfide. It is often useful to limit the amount of sulfide material to 90% of the stoichiometric equivalent of the non-alkali metal ions. In one embodiment, the first solution comprises non-alkali metal ions dissolved therein, and the second solution comprises sulfide ions dissolved therein, and the mole ratio of the non-alkali metal ions to the sulfide ions is 10:9 or more.

The nanoparticle disclosed herein comprises at least one metal sulfide nanocrystal. In one embodiment, the metal sulfide nanocrystals are transition metal sulfide nanocrystals, Group IIA metal sulfide nanocrystals, or mixtures thereof. In another embodiment, the metal sulfide nanocrystals comprise zinc metal sulfide nanocrystals. In yet another embodiment, the mineral form of the zinc metal sulfide nanocrystals is sphalerite crystal form, because sphalerite crystal form has the highest refractive index compared to other mineral forms of zinc sulfide, and so is very useful in nanocomposites for optical applications.

Each nanoparticle comprises at least one metal sulfide nanocrystal, and the exact number of nanocrystals may vary depending on a variety of factors. For example, the number of nanocrystals in each nanoparticle may vary depending on the particular choice of the non-alkali metal salt, the carboxylic acid comprising at least one aryl group, or the sulfide material, as well as their concentrations and relative amounts used in (a) or (b). The number of nanocrystals in each nanoparticle may also vary depending on reaction conditions used in (a) or (b); examples of reaction conditions include temperature, time, and agitation, etc. All of these aforementioned factors may also influence shape, density, and size of the nanocrystals, as well as their overall crystalline quality and purity. The number of metal sulfide nanocrystals may vary for each individual nanoparticle in a given reaction solution, even though the nanoparticles are formed from the same non-alkali metal ions and sulfide material, and in the same reaction solution.

The at least one metal sulfide nanocrystal has a surface modified by the carboxylic acid comprising at least one aryl group. The number of surfaces may vary depending on the factors described in the previous paragraph, as well as on the particular arrangement of nanocrystals within the nanoparticle if more than one nanocrystal is present. One or more individual carboxylic acid molecules may be involved in the surface modification, and there is no limit to the particular arrangement and/or interaction between the one or more carboxylic acid molecules and the at least one metal sulfide nanocrystal as long as the desired properties of the nanoparticle are obtained. For example, many carboxylic acid molecules may form a shell-like coating that encapsulates the at least one metal sulfide nanocrystal, or only one or two carboxylic acid molecules may interact with the at least one metal sulfide nanocrystal.

The plurality of nanoparticles may have any average particle size depending on the particular application. As used herein, average particle size refers to the size of the nanoparticles that can be measured by conventional methods, which may or may not include the carboxylic acid comprising at least one aryl group. The average particle size may directly correlate with the number, shape, size, etc. of the at least one nanocrystal present in the nanoparticle, and the factors described above may be varied accordingly. In general, the average particle size may be 1 micron or less. In some applications, the average particle size may be 500 nm or less, and in others, 200 nm or less. If the nanocomposite is used for optical applications, the average particle size is 50 nm or less in order to minimize light scatter. In some optical applications, the average particle size may be 20 nm or less.

Average particle size may be determined from the shift of the exciton absorption edge in the absorption spectrum of the nanoparticle in solution. Results are consistent with an earlier report on ZnS nanoparticle average size—(R. Rossetti, Y. Yang, F. L. Bian and J. C. Brus, J. Chem. Phys. 1985, 82, 552). Average particle size may also be determined using transmission electron microscopy.

The nanoparticles described above are disclosed in Ser. No. 11/089323 by Denisiuk et al., entitled "Surface Modified Nanoparticle and Method of Preparing Same", and filed of even date herewith, the disclosure of which is hereby incorporated by reference.

The first solution and the sulfide material are combined in (c). Any method of combining may be used, as long as thorough mixing is obtained. In one embodiment, the two are combined by pouring one into the other under rapid stirring.

The nanocomposite is isolated in (d). The particular technique used to isolate the nanocomposite may depend on the first organic solvent, the non-alkali metal salt, the carboxylic acid comprising at least one aryl group, the polymer, and/or the sulfide material. For example, when these components are combined in (c), the nanocomposite may precipitate, and isolation may then be carried out using centrifugation, filtration, etc. For another example, a third solvent may need to be added after the components have been combined in (c), in order to cause the nanocomposite to precipitate. The nanocomposite may also be isolated by simply evaporating any solvents.

In any case, the nanocomposite may then be washed with a solvent such as the first solvent, the second solvent, or the third solvent, or any other solvent that is a non-solvent for the nanocomposite yet is able to remove any residual solvent and impurities. The nanocomposite may then be dried, for example, under ambient conditions or under vacuum, to give a powder. For some applications, removal of all solvents is critical. For nanocomposites used in optical applications, residual solvent may lower the refractive index of the nanoparticles, or cause bubbles and/or haze to form within the nanocomposite.

The present disclosure relates to a nanocomposite prepared by the method comprising:
  (a) providing a first solution having a first organic solvent comprising a non-alkali metal salt, a carboxylic acid comprising at least one aryl group, and a polymer dissolved therein;
  (b) providing a sulfide material;
  (c) combining the first solution and the sulfide material; and
  (d) isolating the nanocomposite, wherein the nanocomposite comprises the polymer and a plurality of nanoparticles, wherein each nanoparticle comprises at least one metal sulfide nanocrystal having a surface modified with the carboxylic acid comprising at least one aryl group.

The nanocomposite disclosed herein may be used in a variety of applications and devices. For example, the nanocomposite disclosed herein may be used as quantum dots in semiconductor applications, or as materials used to track and label molecular processes in living cells and in vitro biological assays. The nanocomposite disclosed herein may also be used as an encapsulant in light emitting devices, or it may be formed into articles such as a lens, prism, film, waveguide, etc. The nanocomposite disclosed herein may be used as a brightness enhancement film for back-lit electronic displays in computer monitors or cell phones. In one embodiment, the nanocomposite has a haze value of less than 5% in order to be useful in optical applications. The term "haze value" refers to the amount of light transmitted by an article and scattered outside a solid angle of 2.5 degrees from the light beam axis. In another embodiment, the nanocomposite has a refractive index that is at least 0.01 greater than the refractive index of the polymer.

The examples described above are presented for illustration purposes only and are not intended to limit the scope of the invention in any way.

EXAMPLES

Thermoplastic Nanocomposite TN-1

A solution was prepared by dissolving 1 g of zinc-acetate, 0.05 g of 2-phenoxybenzoic acid, and 0.5 g of Polycarbonate Z (Iupilon® Z-200 from Mitsubishi Gas Chemical, CAS # 25134-45-6) with 0.25 g of plasticizer poly (phenylene oxide) (Fluka, Polyphenyl ether (6 rings) OS-138, product number 81336, CAS # 56378-65-5) in 30 mL of dimethylformamide. Another solution was prepared by dissolving 100 mL of isopropanol saturated with $H_2S$ in 300 mL water. The zinc acetate solution was poured into the $H_2S$ solution under intensive stirring with the use of a magnet mixer. The mixture became turbid immediately and a white sediment deposited from the solution.

After complete sedimentation (several hours) the sediment was separated from water by decantation and centrifugation, and it was dried at 50° C. in air. If complete sedimentation did not occur after several hours, a drop of ammonia was added. A dry powder was formed. A transparent film was fabricated from this powder by milling at 180° C. between counter-rotating cylinders turning at 5 cm/sec. The nanoparticles were present at 10 volume %, relative to the weight of the nanocomposite.

Thermoplastic Nanocomposites TN-2 to TN-14 and Comparative Example

TN-2 to TN-14 and the Comparative Example were prepared the same as TN-1, except that different carboxylic acids were used. Processability in polycarbonate refers to processing into film by hot molding between two cylinders.

TABLE

| Thermoplastic Nanocomposite | Carboxylic Acid | Processability in Polycarbonate | Comments |
|---|---|---|---|
| TN-1 | 2-phenoxybenzoic acid | yes | transparent and flexible |
| TN-2 | 5-phenylvaleric acid | yes | transparent and flexible |
| TN-3 | 2-phenylbutyric acid | yes | transparent and flexible |
| TN-4 | 3-phenylbutyric acid | yes | transparent and flexible |
| TN-5 | 4-phenylbutyric acid | yes | transparent and flexible |
| TN-6 | 3-phenylpropionic acid | yes | fragile |
| TN-7 | 1-naphthylacetic acid | yes | transparent but fragile |
| TN-8 | 2-naphthoxyacetic acid | yes | transparent but fragile |
| TN-9 | phenoxyacetic acid | yes | required high temperature for hot molding |
| TN-10 | 2-methoxyphenylacetic acid | yes | some yellowing |
| TN-11 | 3-phenoxypropionic acid | yes | not transparent |
| TN-12 | 3,3,3-triphenylpropionic acid | yes | transparent but some yellowing |
| TN-13 | triphenylacetic acid | yes | transparent but some yellowing |
| TN-14 | 4-phenylcinnamic acid | yes | transparent but some yellowing |
| Comparative Example | benzoic acid | no | none |

What is claimed is:

1. A method of preparing a nanocomposite, the method comprising:
   (a) providing a first solution having a first organic solvent comprising a non-alkali metal salt, a carboxylic acid comprising at least one aryl group, and a polymer dissolved therein;
   (b) providing a sulfide material;
   (c) combining the first solution and the sulfide material; and
   (d) isolating the nanocomposite, wherein the nanocomposite comprises the polymer and a plurality of nanoparticles, wherein each nanoparticle comprises at least one metal sulfide nanocrystal having a surface modified with the carboxylic acid comprising at least one aryl group.

2. The method of claim 1, wherein the first organic solvent comprises a dipolar, aprotic organic solvent.

3. The method of claim 1, wherein the non-alkali metal salt comprises a salt of a transition metal, a salt of a Group IIA metal, or mixtures thereof.

4. The method of claim 3, wherein the non-alkali metal salt comprises a zinc sulfide nanocrystal of spahlerite crystal form.

5. The method of claim 1, wherein the nanoparticles have an average particle size of less than 50 nm.

6. The method of claim 1, wherein the carboxylic acid comprising at least one aryl group has a molecular weight of from 60 to 1000.

7. The method of claim 1, wherein the carboxylic acid comprising at least one aryl group is represented by the formula:

$$Ar-L^1-CO_2H$$

wherein $L^1$ comprises an alkylene residue of from 1 to 10 C atoms, and wherein the alkylene residue is saturated, unsaturated, straight-chained, branched, or alicyclic; and Ar comprises a phenyl, phenoxy, naphthyl, naphthoxy, fluorenyl, phenylthio, or naphthylthio group.

8. The method of claim 1, wherein the carboxylic acid comprising at least one aryl group is 3-phenylpropionic acid; 4-phenylbutyric acid; 5-phenylvaleric acid; 2-phenylbutyric acid; 3-phenylbutyric acid; 1-napthylacetic acid; 3,3,3-triphenylpropionic acid; triphenylacetic acid; 2-methoxyphenylacetic acid; 3-methoxyphenylacetic acid; 4-methoxyphenylacetic acid; 4-phenylcinnamic acid, or mixtures thereof.

9. The method of claim 1, wherein the carboxylic acid comprising at least one aryl group is represented by the formula:

$$Ar-L^2-CO_2H$$

wherein $L^2$ comprises a phenylene or napthylene residue; and

Ar comprises a phenyl, phenoxy, naphthyl, naphthoxy, fluorenyl, phenylthio, or naphthylthio group.

10. The method of claim 1, wherein the carboxylic acid comprising at least one aryl group is 2-phenoxybenzoic acid; 3-phenoxybenzoic acid; 4-phenoxybenzoic acid; 2-phenylbenzoic acid; 3-phenylbenzoic acid; 4-phenylbenzoic acid; or mixtures thereof.

11. The method of claim 1, wherein the polymer comprises a thermoplastic polymer.

12. The method of claim 1, wherein the polymer comprises a polyolefin, polystyrene, polyacrylate, polymethacrylate, polyacrylic acid, polymethacrylic acid, polyether, polybutadiene, polyisoprene, polyvinylchloride, polyvinylalcohol, polyvinyl acetate, polyester, polyurethane, polyurea, polycarbonate, polyamide, polyimide, cellulose, or mixtures thereof.

13. The method of claim 1, wherein the polymer comprises a copolymer of a polyolefin, polystyrene, polyacrylate, polymethacrylate, polyacrylic acid, polymethacrylic acid, polyether, polybutadiene, polyisoprene, polyvinylchloride, polyvinylalcohol, polyvinyl acetate, polyester, polyurethane, polyurea, polycarbonate, polyamide, polyimide, or cellulose.

14. The method of claim 1, wherein the sulfide material comprises hydrogen sulfide gas.

15. The method of claim 1, wherein the sulfide material comprises a second solution having a second organic solvent comprising hydrogen sulfide gas or sulfide ions dissolved therein, wherein the second organic solvent is miscible with the first organic solvent.

16. A nanocomposite prepared using the method of claim 1.

17. The nanocomposite of claim 16 having a haze value of less than 5%.

18. The nanocomposite of claim 16 having a refractive index that is at least 0.01 greater than the refractive index of the polymer.

* * * * *

UNITED STATES PATENT AND TRADEMARK OFFICE
CERTIFICATE OF CORRECTION

PATENT NO. : 7,172,811 B2  
APPLICATION NO. : 11/089347  
DATED : February 6, 2007  
INVENTOR(S) : Igor Y. Denisyuk Page 1 of 1

It is certified that error appears in the above-identified patent and that said Letters Patent is hereby corrected as shown below:

Title Page, col. 2 (Other Publications)
Line 13 - Delete "transitions".," and insert -- transitions", --, therefor.

Column 1
Line 12 - Delete "herewith;" and insert -- herewith (Docket 60352); --, therefor.

Column 1
Line 15-16 - Delete "herewith." and insert -- herewith (Docket 60555). --, therefor.

Column 3
Line 63-64 - Delete "(lupilon®)" and insert -- (Iupilon® --, therefor.

Column 5
Line 45 - Delete "herewith," and insert -- herewith (Docket 60352), --, therefor.

Signed and Sealed this

Twelfth Day of June, 2007

JON W. DUDAS  
*Director of the United States Patent and Trademark Office*